Dec. 27, 1949   P. KLOTSCH ET AL   2,492,582
CYLINDER HEAD CONSTRUCTION
Filed May 4, 1946
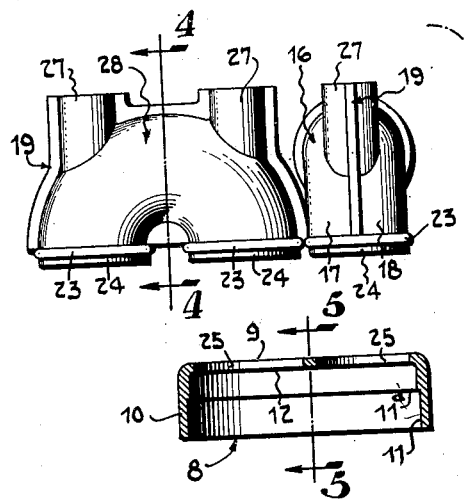
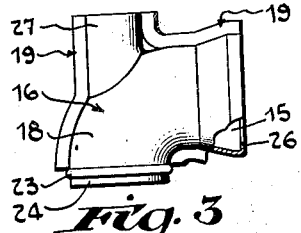
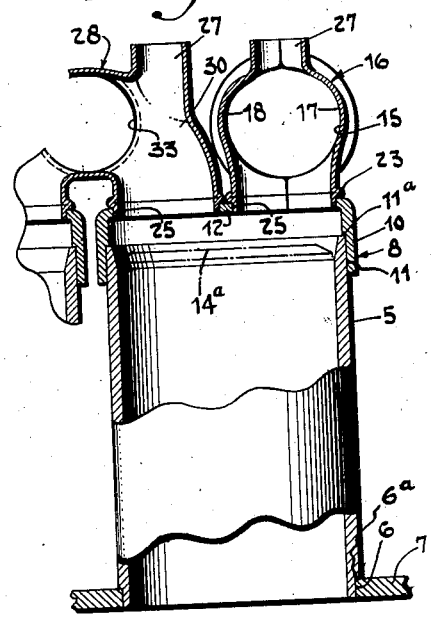
Fig. 3
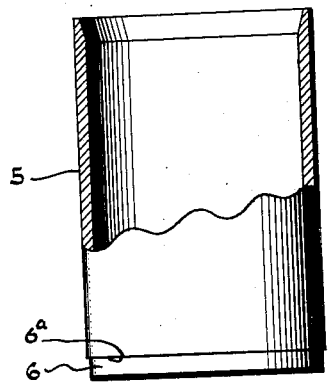
Fig. 1
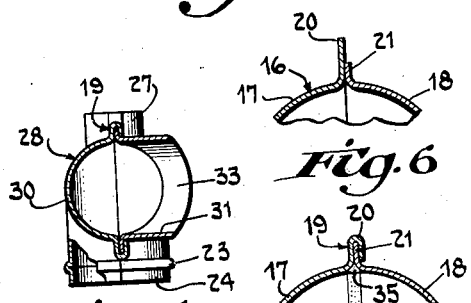
Fig. 2
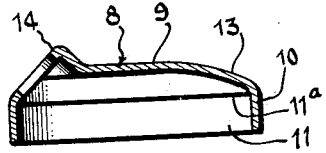
Fig. 5    Fig. 4    Fig. 7
INVENTORS
Paul Klotsch
BY Earl A. Taylor
Wood, Arey, Herron & Evans
ATTORNEYS Patented Dec. 27, 1949

2,492,582

UNITED STATES PATENT OFFICE 2,492,582

CYLINDER HEAD CONSTRUCTION

Paul Klotsch and Earl A. Taylor, Cincinnati, Ohio, assignors to Crosley Motors, Inc., Cincinnati, Ohio, a corporation of Ohio Application May 4, 1946, Serial No. 667,463

3 Claims. (Cl. 123—193)

This invention relates to the fabrication of hydrogen brazed sheet metal engines and has particular reference to a stamped sheet metal cylinder head, press-fitted and brazed upon a seamless steel cylinder sleeve, and the fabrication and assembly of stamped sheet metal valve bonnets pressed and brazed into openings or ports of the cylinder head.

The upper portion of the cylinders, cylinder heads and valve bonnets, in assembled relationship in the engine, are enclosed by a water jacket and are exteriorly exposed to the coolant therein. It is of advantage to form the parts from light gauge metals to provide for rapid dissipation of the heat of combustion thereby improving engine efficiency and providing a light weight assembly. Furthermore, it has been observed that the utilization of relatively thin walled cylinders and cylinder heads has a decidedly beneficial effect on engine performance tending toward smoother operation and the elimination of knocks under adverse operating conditions.

The cylinder sleeves are therefore formed of seamless steel tubing having a thickness of approximately $\frac{1}{16}$ but not over $\frac{3}{32}$ of an inch thick. The cylinder heads constitute sheet metal stampings having a thickness of approximately $\frac{1}{16}$ of an inch, the heads being secured to the cylinders by a press or shrink fit and the joints subsequently brazed. The valve bonnets may be of relatively light gauge sheet metal, for example, $\frac{1}{32}$ of an inch thick, and have their ends pressed and brazed into ports formed in the heads for this purpose. The bonnets are not exposed to the direct combustion pressures of the cylinder, serving instead as conduits for the intake and exhaust passage of the gases as controlled by the valves of the engine. Therefore light gauge sheet metal may be used in their construction. The valve bonnets are preferably two in number constituting intake and exhaust passageways.

The intake bonnet is designed to serve two cylinders and therefore is in the form of a U-shaped return bend spanning and connecting the cylinders in pairs. This bonnet includes a pair of vertical valve stem guide sleeves formed integrally therewith and in axial alignment with the cylinder head ports. Each sleeve is adapted to receive a valve stem guide bushing for the valve stem and is seated upon a valve seat insert which is pressed into position in its port. The intake bonnet further includes a lateral opening communicating with the intake manifold of the engine exterior of the water jacket.

The exhaust port of the cylinder head is provided with an individual exhaust valve bonnet constituting a right angle elbow having one end secured in the cylinder head port and its opposite end communicating with an exhaust manifold to the outside of the water jacket. This bonnet likewise includes a vertical valve guide sleeve in axial alignment with the exhaust port of the cylinder head as described with reference to the intake valve bonnet.

The complex configuration of the respective valve bonnets presents an exceedingly difficult stamping operation. Moreover, the stamping necessarily is required to be within reasonably accurate limits as to concentricity and diameter so as to make the desired light press fit with the valve ports and the valve stem sleeves are required to be located within accurate limits with respect to the center of the valve ports so as to properly align the valves with the valve seat inserts disposed in the ports. The center-to-center dimension between the ends of the U-shaped intake bonnet likewise must be within fixed limits to conform to the spacing of the upper ends of adjacent cylinders which are connected in paired relationship by the bonnet.

The present invention is predicated upon the concept of fabricating the bonnets of split formation in the form of two complementary longitudinal half sections, each section having a marginal flange, one of which is subsequently lapped over the other to form a lapped seam, the seam subsequently sealed and rigidified by the penetration of the brazing material when the assembly is permanently hydrogen brazed in a brazing furnace. This construction permits the use of a preferred grade of steel since the forming operation is a relatively simple one capable of being performed by stamping as distinguished from drawing which would require a mild steel. The sectional stamping of the parts provides that the dimensional limits, concentricity and alignment of the assembled bonnets may be held within the required tolerances.

It has therefore been an object of the present inventor to provide a sheet metal valve bonnet and cylinder head assembly of accurate configuration, concentricity and alignment by forming the bonnet of complementary half sections semi-circular in cross section and seamed and permanently brazed together in matching relationship.

It has been another object to provide a combined cylinder head and valve bonnet construction of relatively inexpensive manufacture, the parts permanently united by brazing to form a unified structure, and formed of sheet metals adapted to provide a slight degree of resiliency and conducive to rapid heat dissipation and improved engine performance.

It has been a further object to provide stamped sheet metal valve bonnets of sectional construction joined by a continuous lapped seam and united with the cylinder head by a continuous braze which extends without interruption around the lapped seams to permanently join and seal the bonnet sections together and to the cylinder heads as an integral unit.

Further objects and advantages of the invention will be more fully apparent from the description of the accompanying drawings, in which:

Figure 1 is an exploded view partially in section, showing the cylinder sleeve, head, and valve bonnets before assembly.

Figure 2 is a sectional view showing the various parts assembled and brazed together as a unit of the internal combustion engine.

Figure 3 is a side view of the exhaust valve bonnet.

Figure 4 is a sectional view taken on line 4—4, Figure 1, detailing the lapped seam joining the respective sections of the intake valve bonnet.

Figure 5 is a cross sectional view of the cylinder head, indicated on line 5—5, Figure 1.

Figure 6 is an enlarged sectional view showing the seam before crimping.

Figure 7 is an enlarged sectional view showing the seam after crimping and brazing.

Referring to the drawings, the cylinder sleeve is indicated at 5 and includes a reduced portion 6 at its lower end which is adapted to be pressed into an aperture in the base plate 7, the base plate providing a flange or mounting plate for the cylinder block. The cylinder head, generally indicated at 8, includes a top wall 9 and a flange portion 10 embracing the top of the cylinder sleeve. The flange 10 of the head includes an enlarged bore portion 11 into which is pressed the upper end of the cylinder 5. The top wall 9 of the cylinder head includes a flat area 12 as viewed in Figure 1. This provides a flat seat adapted to be engaged by annular beads hereinafter described formed at the lower ends of the valve bonnets and serving to limit the insertion of the bonnets, maintain a proper alignment of the bonnets with the heads and provide a contact surface for a braze fillet between the head and bonnets. As shown in Figure 5 the top of the head at right angles to the bonnets is curved or domed at as 13 and includes a spark plug receiving boss 14 therein.

The shoulder 6a at the lower end of the cylinder sleeve and the shoulder 11a of the cylinder head are accurately located and serve as stops or abutments to limit or control the distance between the bottom of the base plate and the top of the cylinder head when these parts are pressed together in assembly. This distance is critical since it controls the compression ratio of the cylinder engine. In order to maintain this ratio as uniform as possible for all of the cylinders of the engine, the shoulders of all of the cylinders and heads making up the engine assembly are machined uniformly. The area between the top of the cylinder head and the upper limit of piston travel, indicated at 14a, constitutes the combustion chamber of the cylinder and as such is exposed to pressures and temperatures of maximum intensity at the moment of firing. The thin wall section of the cylinder head top is designed to induce rapid cooling, therefore resulting in increased engine efficiency and power output. Its slight inherent resiliency promotes smooth operation and tends to eliminate knocking.

The connection of the cylinder head with the upper end of the cylinder, is accomplished either by a press or shrink fit. If a press fit is utilized, a metal-to-metal interference is maintained between the diameter of the aperture of the base plate and the cylinder head. The parts are then assembled under high pressure, preferably by the use of a hydraulic press. If assembled by a shrink fitting, a temperature differential is accomplished either by raising the temperature of the cylinder head, or by lowering the temperature of the cylinder sleeve. In either event, an appropriate interference provides a pressure fit when the parts return to a normal temperature. When the assembly is brazed, brazing material flows into these pressure constituted joints to provide an integral sealed union between the parts.

The lower end of the cylinder sleeve may be joined to the base plate as above described or alternatively, it may be staked in place in the aperture. In the latter instance a snug fit is provided and the lower end of the sleeve extends slightly beyond the lower surface of the base plate. This portion is then flattened or upset at several points around its circumference, for example in a hydraulic press, in effect riveting the sleeve to the plate. After brazing the excess material is removed in machining the base plate.

As shown, the exhaust valve bonnet 16 is fabricated of two elbow shaped complementary half sections 17 and 18 joined longitudinally by the lapped seam generally indicated at 19. The respective sections are generally semi-circular in cross section so as to form a true circle when placed together. As shown, the seam is formed by integral marginal flanges extending around the longitudinal configuration of the respective half sections. The flange 20 for the section 17 is approximately twice as wide as the flange 21 for the section 18. These respective half sections are then placed together bringing the flanges 20 and 21 together in abutment in a single plane. The wider flange 21 is then deformed, so as to overlie and clinch the flange 20, by means of suitable clinching dies.

It will be noted that the lower end of the bonnet which is adapted to be pressed into the cylinder head port is provided with a peripheral bead 23, thereby defining a rim 24 for insertion into the aperture or port 25 of the cylinder head. This rim is formed accurately as to diameter and concentricity so as to make a light press fit with the aperture when the bonnet is inserted therein. The bead 23 provides a shoulder to limit the extent to which the rim may be inserted into the cylinder head port, the bead contacting the exterior flat top surface 12 of the head to position and align the bonnet relative to the head as previously described. The rim is of sufficient length to extend approximately to the interior surface of the head to provide a brazing surface for the full wall thickness of the head.

A valve stem guide sleeve 27 is formed as an integral part of the bonnet and extends vertically in axial alignment with the rim 24 and port 25, the seam 19 extending along the opposite sides to the upper end of the sleeve. This sleeve is circular in cross section and is arranged to receive a valve stem guide bushing (not shown)

which is pressed therein and brazed in position to serve as a guide for the valve stem. Valve seat inserts (not shown) are pressed into the valve ports 25 and extended within the lower end of the bonnet, clinched in place and subsequently brazed. This complete assembly is disclosed in the copending application of Herbert F. Junkin for Metallic structures and method of fabricating same, Serial No. 616,004, now Patent No. 2,486,654, to which attention is invited.

The bonnet is designed to extend from the top of the cylinder head laterally to the side wall of the water jacket to connect with an exhaust manifold, secured to the outside of the jacket. For this purpose the discharge end 15 of the bonnet includes an annular inturned flange or lip 26, see Figure 3. This is arranged to lie against the inside surface of the water jacket to be secured by a short collar (not shown) telescopically engaged therein and having an outwardly crimped flange engaging the flange 26. The outer end of the collar is suitably connected to a stiffener plate disposed to the exterior of the jacket to which the manifolds are bolted, the openings of the manifold being in registry with the discharge openings 15 of the bonnets. The design and arrangement above described which is not illustrated, is not an essential part of the present invention; therefore, reference is made to the copending application of Paul Klotsch for Internal combustion engine, Serial No. 662,323, for a more complete disclosure.

The intake valve bonnet 28 constitutes a U-shaped return bend conduit having its respective opposite ends connected to ports 26 of adjacent cylinders. Thus the cylinders are connected in pairs and each valve bonnet serves as a duct for two adjacent cylinders. The bonnet additionally constitutes a reinforcement to strengthen the cylinder and head assembly. By virtue of its arch-like contour, the upward forces imposed upon one head of a pair, at the moment of firing, is resisted by the other, it being understood that the cylinders fire alternately. The joined pair of cylinders thus constitutes a reinforced unit substantially strengthened by the bonnets.

The fabrication of the intake bonnet 28 in general follows the fabrication of the exhaust bonnet 16, being formed from complementary stamped half sections joined by a crimped seam 19. In the case of the intake bonnet 28, a pair of vertical valve guide sleeves 27 is provided, each being in axial alignment with the respective rims 24—24 at opposite ends of the bonnet. The beads 23 are located in the same manner as those of the exhaust bonnet and the lapped seam 19 follows the same construction.

Generally described, the intake duct or bonnet is fabricated from a pair of arcuately shaped complementary half sections 30 and 31 semi-circular in cross section and having integral marginal flanges 20 and 21, as previously described, the wider of the two being clinched to form a return bend overlying the narrower flange, thus forming a single lapped seam. The configuration of the respective half sections is identical with the exception of a lateral passageway 33 formed in the section 31. This passageway is adapted to receive a sleeve which is brazed thereto to form an extension communicating with an intake manifold in the same manner as previously described with reference to the exhaust bonnet.

By reason of the relatively simple stamping operation the bonnets may be held within relatively close manufacturing tolerances, thereby providing an inexpensive accurately constructed assembly. When the two sections are clinched together the concentricity of the rim portions and valve sleeves and alignment thereof is within limits sufficiently close for proper alignment of the valves and seats. The two-piece construction of the bonnets provides that a relatively hard grade of steel may be utilized. The lapped seam additionally serves to stiffen and reinforce the bonnets longitudinally.

In assembling the half sections to form a bonnet they are preferably placed in suitable clinching dies in proper alignment, and the seam 19 is then formed, clinching the parts rigidly in assembly. The assembled bonnets are then pressed into the ports 26 of the cylinder head. At final assembly of the block a brazing wire is applied about the circumference of the bonnets adjacent the rim 24, and a suitable brazing paste is applied to the seams 19. Brazing wires also are applied to the cylinder at the juncture of the cylinder head and at the juncture of the cylinder with the base plate 7 at the bottom. The assembly is then placed in the brazing furnace and a temperature of approximately 2000° Fahrenheit is maintained in a non-oxidizing atmosphere causing the brazing materials to fuse and penetrate into the various joints and crevices. The brazed bond provides a permanent union and gas pressure tight seal between the several parts and forms a fillet indicated at 35 (see Figure 7) at the seam in the interior of the bonnets to produce a smooth uninterrupted interior surface.

It has been determined that the joints thus formed have approximately the same strength characteristics as that of the materials from which the parts are fabricated. In this respect, the assembly is similar to a one-piece cast or forged construction but has the added advantages of being a thin wall construction and therefore being resilient, heat transmitting, accurate, and of low cost construction.

After final assembly and brazing of the cylinder block, the valve stem guide bushings and valve seat inserts are machined for proper running clearances and seating of the valves and the cylinders are machined and accurately bored.

If desired, the valve bonnets and cylinder heads may be assembled and brazed as subassemblies prior to final assembly and brazing of the cylinder block. In this event the valve seat inserts and valve stem guide bushings may be installed in the subassembly and machined prior to final assembly and brazing, or may be installed and brazed with the final assembly, then machined.

Having described our invention, we claim:

1. In an internal combustion engine the combination of a pair of seamless steel cylinder sleeves, each having a sheet metal cylinder head fitted and brazed thereon, a light gauge sheet metal valve bonnet in the form of an arcuate shaped return bend providing a span between said cylinder heads and having respective opposite open ends, said valve bonnet formed of complementary half sections joined by a lapped and brazed seam following the longitudinal contour of the bonnet centrally thereof, said seam providing a reinforcing rib to stiffen said bonnet, each cylinder head having ports of a size to permit the ends of the bonnet to be pressed therein and permanently united by brazing, to connect the tops of the cylinder sleeves together, and a base plate, the plate having apertures therein to receive the lower ends of the cylinder sleeves, the sleeves being permanently brazed to said plate to secure their lower ends together.

2. In an internal combustion engine, the combination of a pair of steel cylinder sleeves, each having a sheet metal cylinder head brazed thereon, a sheet metal valve bonnet fixed to and connecting said cylinder heads, said bonnet comprising; two complementary arch-type sheet metal stampings, said stampings being joined in a longitudinal brazed, lapped seam, said seam defining an arch-type, reinforcing rib for said bonnet, said bonnet constituting a reinforced arch between said cylinder heads, whereby each of said cylinders and said arch-type bonnet supports the other of said cylinders during alternate firing of said cylinders.

3. In an internal combustion engine, the combination of a pair of steel cylinder sleeves each having a sheet metal cylinder head brazed thereon, an arch-like sheet metal valve bonnet fixed to and connecting said cylinder heads, said bonnet constituting a reinforcing arch span between said cylinder heads, whereby each of said cylinders through said arch-type bonnet supports the other cylinder head during alternate firing of said cylinders.

PAUL KLOTSCH.
EARL A. TAYLOR.

REFERENCES CITED

The following references are of record in the file of this patent:

UNITED STATES PATENTS

| Number | Name | Date |
|---|---|---|
| 176,835 | Carson | May 2, 1876 |
| 1,113,124 | Jacobs | Oct. 6, 1914 |
| 2,023,354 | Cope | Dec. 3, 1935 |
| 2,071,583 | Schutt | Feb. 23, 1937 |
| 2,190,719 | Leighton | Feb. 20, 1940 |
| 2,199,423 | Taylor | May 7, 1940 |
| 2,275,478 | Taylor | Mar. 10, 1942 |
| 2,337,577 | Taylor | Dec. 28, 1943 |
| 2,341,488 | Taylor | Feb. 8, 1944 |